United States Patent [19]
Wang et al.

[11] Patent Number: 5,428,819
[45] Date of Patent: Jun. 27, 1995

[54] METHOD AND APPARATUS FOR RADIO FREQUENCY BANDWIDTH SHARING AMONG HETEROGENEOUS RADIO COMMUNICATION SYSTEM

[75] Inventors: Zhonghe Wang, Lake Worth; Richard C. Bernhardt, West Palm Beach; Thomas V. D'Amico, Boca Raton, all of Fla.

[73] Assignee: Motorola, Inc., Schaumburg, Ill.

[21] Appl. No.: 53,637

[22] Filed: Apr. 27, 1993

[51] Int. Cl.⁶ ............................................. H04Q 7/00
[52] U.S. Cl. .................................. 455/34.1; 455/58.1; 455/62; 455/67.1
[58] Field of Search ................ 455/9, 33.1, 33.2, 33.3, 455/33.4, 34.1, 34.2, 58.1, 58.2, 62, 67.1, 63, 67.3; 379/59, 60; 375/95.1, 95.3

[56] References Cited
U.S. PATENT DOCUMENTS

| | | | |
|---|---|---|---|
| 5,040,238 | 8/1991 | Comroe et al. | 455/33.4 |
| 5,095,529 | 3/1992 | Comroe et al. | 455/34.1 |
| 5,125,103 | 6/1992 | Grube et al. | 455/33.1 |
| 5,247,701 | 9/1993 | Comroe et al. | 455/33.4 |

*Primary Examiner*—Reinhard J. Eisenzopf
*Assistant Examiner*—Nguyen Vo
*Attorney, Agent, or Firm*—D. Andrew Floam; Gregg E. Rasor

[57] ABSTRACT

An etiquette controller (112) in a transmitter (14) in a first radio frequency (RF) communications system (10) enables radio frequency communications in a frequency bandwidth shared with heterogeneous RF communication systems (15). The etiquette controller (112) monitors the first RF signals in an isochronous frequency channel in a sub-band of the shared frequency bandwidth to determine whether (124) a frequency channel is free or whether (130, 136) the frequency channel comprises a communication channel which is free. In addition, the etiquette controller (112) causes the RF transceiver (102) to transmit (148) a channel relinquishment signal, monitors (150) the isochronous frequency channel for a predetermined monitoring time, and determines (152) whether the isochronous frequency channel is then free for the channel access.

21 Claims, 7 Drawing Sheets

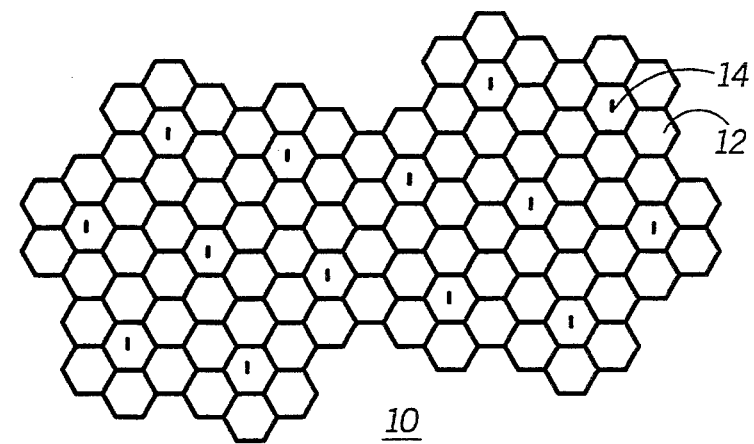
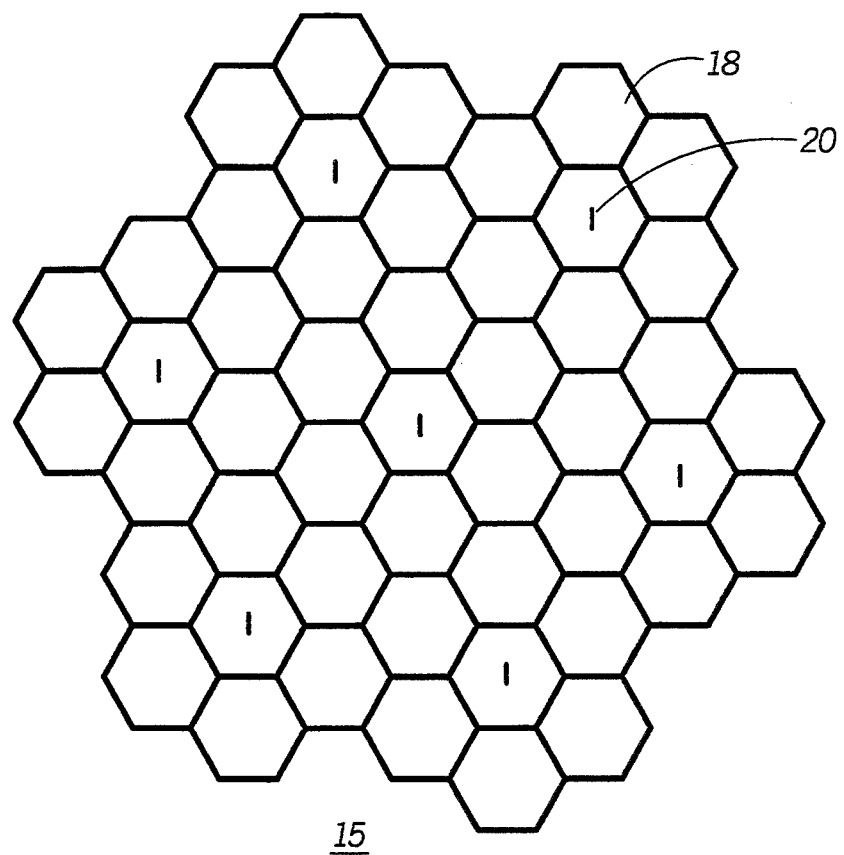
FIG.1

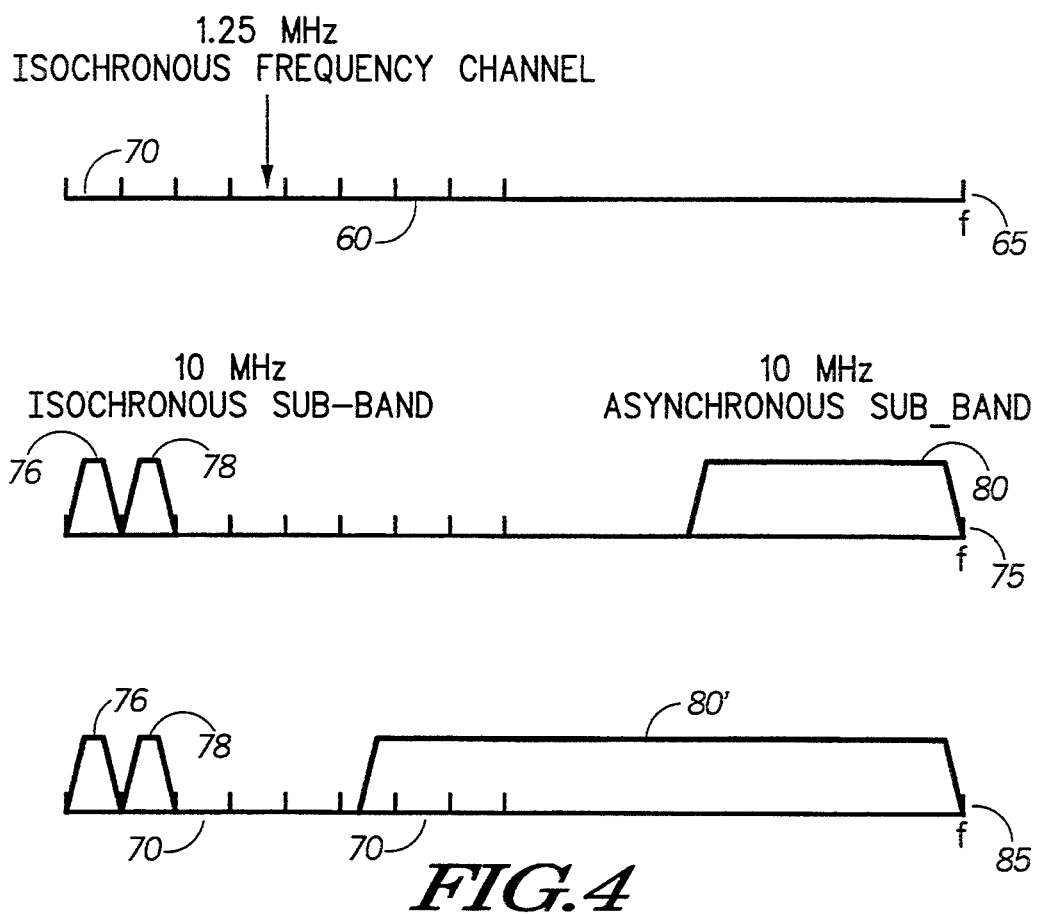
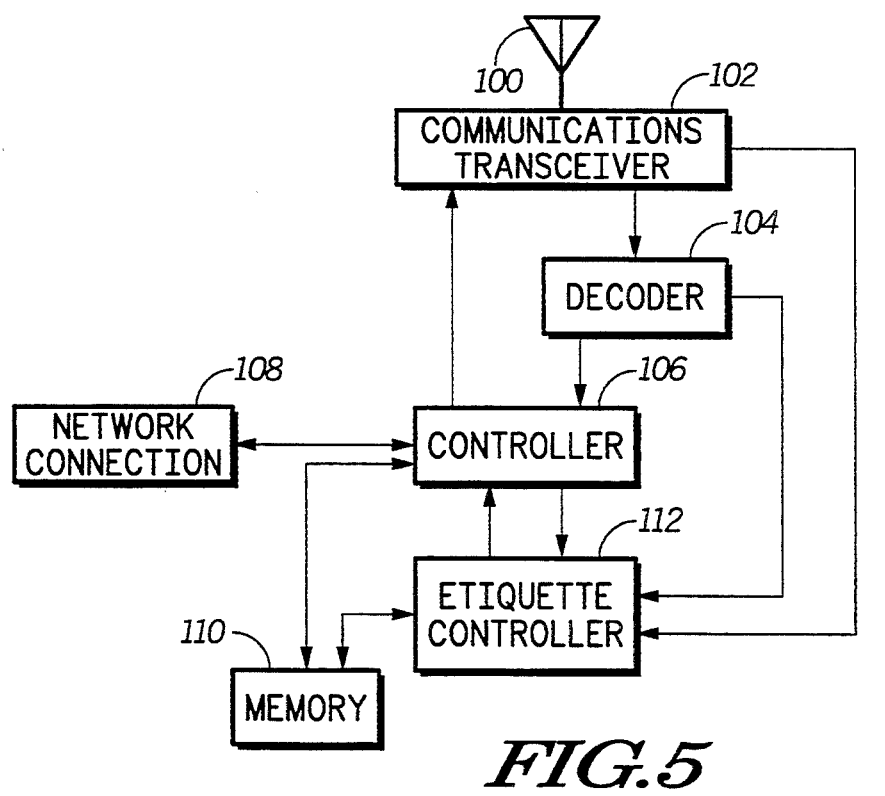

METHOD AND APPARATUS FOR RADIO FREQUENCY BANDWIDTH SHARING AMONG HETEROGENEOUS RADIO COMMUNICATION SYSTEM

FIELD OF THE INVENTION

This invention relates in general to radio communication systems, and in particular to radio communication systems which, though heterogeneous one to another, must necessarily operate on a common radio frequency bandwidth.

BACKGROUND OF THE INVENTION

The increase in the popularity of highly portable telecommunications has led to an increase in the number and types of radio communications systems. For example, Personal Communication Systems (PCS), which may comprise second generation cordless telephones (CT-2), utilize digital telephone technology to release a user from the confinement of using his telephone only in his home. In a PCS system, the CT-2 handset can be carried on one's person and calls can be made by establishing a radio frequency link with a telepoint base station or a private base station. Other recently developed, highly portable radio communications systems are the Digital European Cordless Telephone system (DECT), the Bellcore FA technology, and a telecommunications system developed by Qualcomm.

Yet, not all radio frequency (RF) communications systems are homogeneous requiring an allocation of RF bandwidth for the various RF communication systems. In the United States, the Federal Communications Commission (FCC) governs the allocations of various radio frequency bands for use by the multiplicity of heterogeneous RF communication systems. The rules and regulations of the FCC require that radio frequency operation within an allocated frequency band be licensed by the FCC.

Virtually no frequencies below 3 GHz in the RF spectrum in the United States are unallocated. Currently no frequency bands are allocated for usage by the new highly portable RF communication systems, such as PCS. To obtain reallocation of a frequency band from the FCC could take a long time and require a substantial investment of time and funds for political lobbying and other bureaucratic requirements.

Certain frequency bands under FCC Part 15 Regulations are allocated for unlicensed operation. The newly developed RF communication systems could operate in these unlicensed frequency bands. However, there could be an unlimited number of different RF communication systems within a frequency band and the possible users could be broadcasting in any of a number of different multiple access techniques, such as time division multiple access (TDMA), frequency division multiple access (FDMA), code division multiple access (CDMA) or wireless data systems using carrier sense multiple access (CSMA). Even systems sharing the same multiple access technique may have different parameters, protocols and Common Air Interfaces (e.g., the frame length and the number of time slots in a frame of a TDMA system). The transmitters may be isochronous and transmit at regular intervals (as likely with voice service), or asynchronous and transmit at irregular intervals (e.g., local area network (LAN) data systems).

It has been proposed that unlicensed PCS systems operate within a 20 MHz bandwidth in the 2 GHz band. A service provider who provides a PCS system utilizing unlicensed RF operation, however, cannot predict the future use of the RF channels adopted. Many communication service providers are reluctant to invest much money in RF communication system infrastructure which would operate in an unlicensed spectrum because of the risk that the spectrum could become overcrowded, chaotic, and ultimately unusable for public telepoint service.

Thus, what is needed is a method and apparatus to allow devices of different RF communication systems to coexist in an interference-limited environment by constraining all devices to a known behavioral envelope.

SUMMARY OF THE INVENTION

In carrying out the objects of the present invention in one form, there is provided an apparatus in a first radio frequency (RF) communications system for radio frequency communications in a frequency bandwidth shared with at least a second RF communication system. The frequency bandwidth comprises a plurality of sub-bands, each of the plurality of sub-bands comprising at least one isochronous frequency channel. The apparatus comprises an RF transceiver for receiving first RF signals and for transmitting second RF signals, a decoder for determining whether the first RF signals are decodable as an interoperable transmitter signal, and a controller for controlling communication on an assigned communication channel. The apparatus also comprises an etiquette controller coupled to the RF transceiver for monitoring the first RF signals in a first isochronous frequency channel in one of the plurality of sub-bands associated with the first RF communication system to determine whether the first isochronous frequency channel is free or whether the first isochronous frequency channel comprises a communication channel which is free. The etiquette controller is also coupled to the decoder for determining whether the first isochronous frequency channel is decodable as an interoperable transmitter signal if the first isochronous frequency channel is not free. In addition, the etiquette controller is coupled to the controller for assigning a free communication channel of the first isochronous frequency channel as the assigned communication channel if (a) the first isochronous frequency channel is free or (b) if the first isochronous frequency channel is decodable as an interoperable transmitter signal and has a free communication channel.

In another form, there is provided a method in a first radio frequency (RF) communication system for sharing a frequency bandwidth with at least a second RF communication system. The shared frequency bandwidth comprises a plurality of sub-bands, at least one of the plurality of sub-bands comprising at least one isochronous frequency channel. The method comprises the steps of determining whether there is a free communication channel for channel assignment, determining whether an interoperable system is active in a first isochronous frequency channel in one of the plurality of sub-bands associated with the first RF communication system if there is not a free communication channel for assignment in the band or sub-band, the first isochronous frequency channel associated with the first RF communication system, and blocking the channel assignment if an interoperable system is active in the first isochronous frequency channel.

BRIEF DESCRIPTION OF THE DRAWING

FIG. 1 is a representation of two radio frequency (RF) communication systems having multiple cells.

FIG. 4 is a diagram of the frequency assignments of a 20 MHz portion of a shared unlicensed frequency bandwidth in accordance with the present invention.

FIG. 5 is an electrical block diagram of an RF communication system base station in accordance with a preferred embodiment of the present invention.

DETAILED DESCRIPTION OF THE INVENTION

Figure 2:
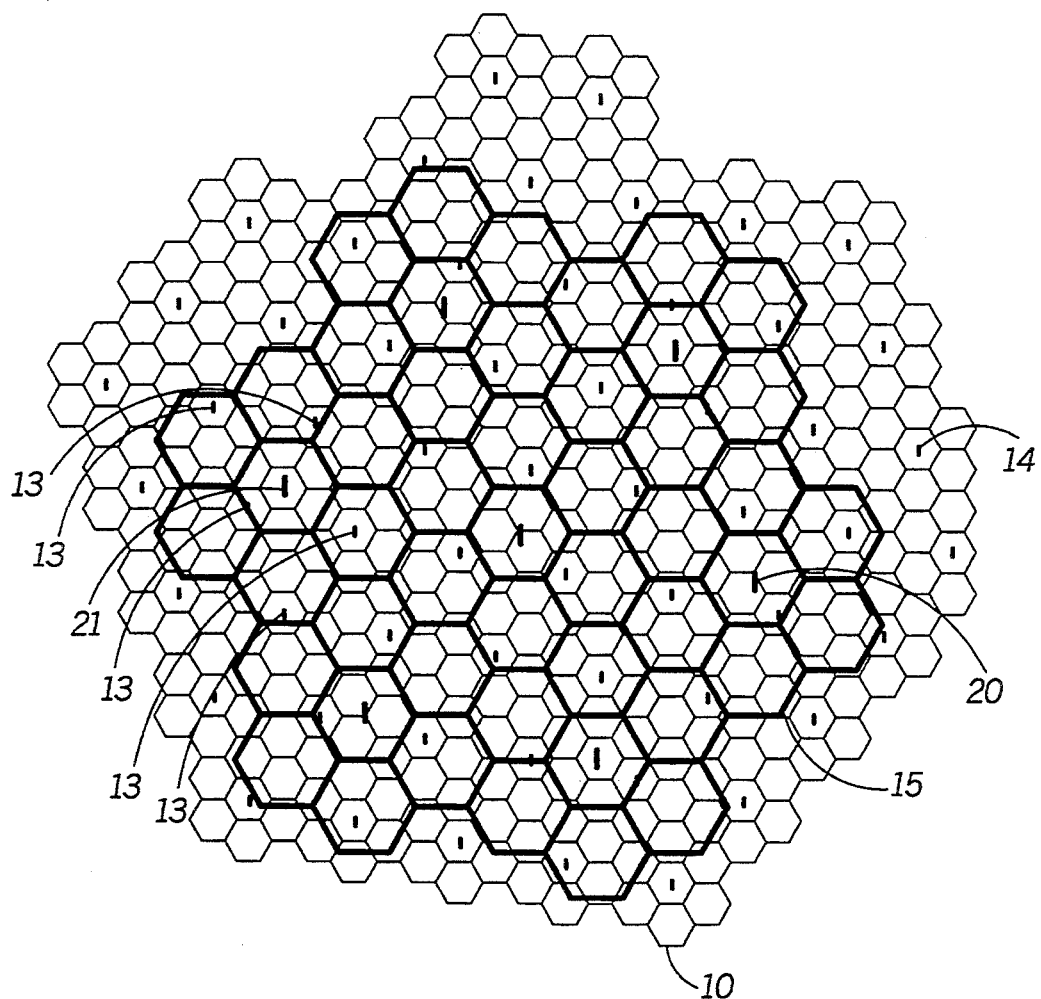
FIG. 2 is a representation of two RF communication systems wherein the multiple cells of the two systems overlap.

Several different radio frequency (RF) communication systems cannot easily operate within the same frequency band. Referring to FIG. 1, a first RF communication system 10 covers a plurality of coverage areas or cells 12, represented as hexagonal shapes. It is obvious to one skilled in the art that the cells 12 are not truly hexagonal and that the hexagonal geometric shape is used for representation only. Within each cell 12, a transmitter broadcasts the RF signal to enable the RF communication system 10.

Some of the transmitters 14 are depicted. The depicted transmitters 14 are related one to another in that the transmitters 14 may concurrently use the same communication channel. This property is called channel reuse. As can be seen, a single channel can be reused within the RF communication system 10 by all of the depicted transmitters 14. The system capacity can be determined from the channel reuse within the system.

A second RF communication system 15, different from the RF communication system 10 (i.e., heterogeneous) and having coverage areas or cells 18 larger than the cells 12 of RF communication system 10, allows channel reuse at a plurality of transmitters 20. The RF communication systems 10, 15 are separate one from another and, consequently, the capacity of the systems 10, 15 as measured by channel reuse is not reduced by the two systems operating within a single RF bandwidth.

Referring next to FIG. 2, the RF communication systems 10, 15 are depicted as overlapping. The overlapping of systems 10, 15 result in channel reuse restrictions. For example, when transmitter 21 is broadcasting on a channel, transmitters 13 cannot concurrently broadcast on the same channel. This conflict in channel reuse between the two heterogeneous RF communication systems 10, 15 results in a reduced overall system capacity. Accordingly, it is necessary in such an overlapped environment that a transmission etiquette be practiced by the RF communication systems 10, 15 to allow the devices of the two systems 10, 15 to coexist in an interference-limited environment.

Figure 3:
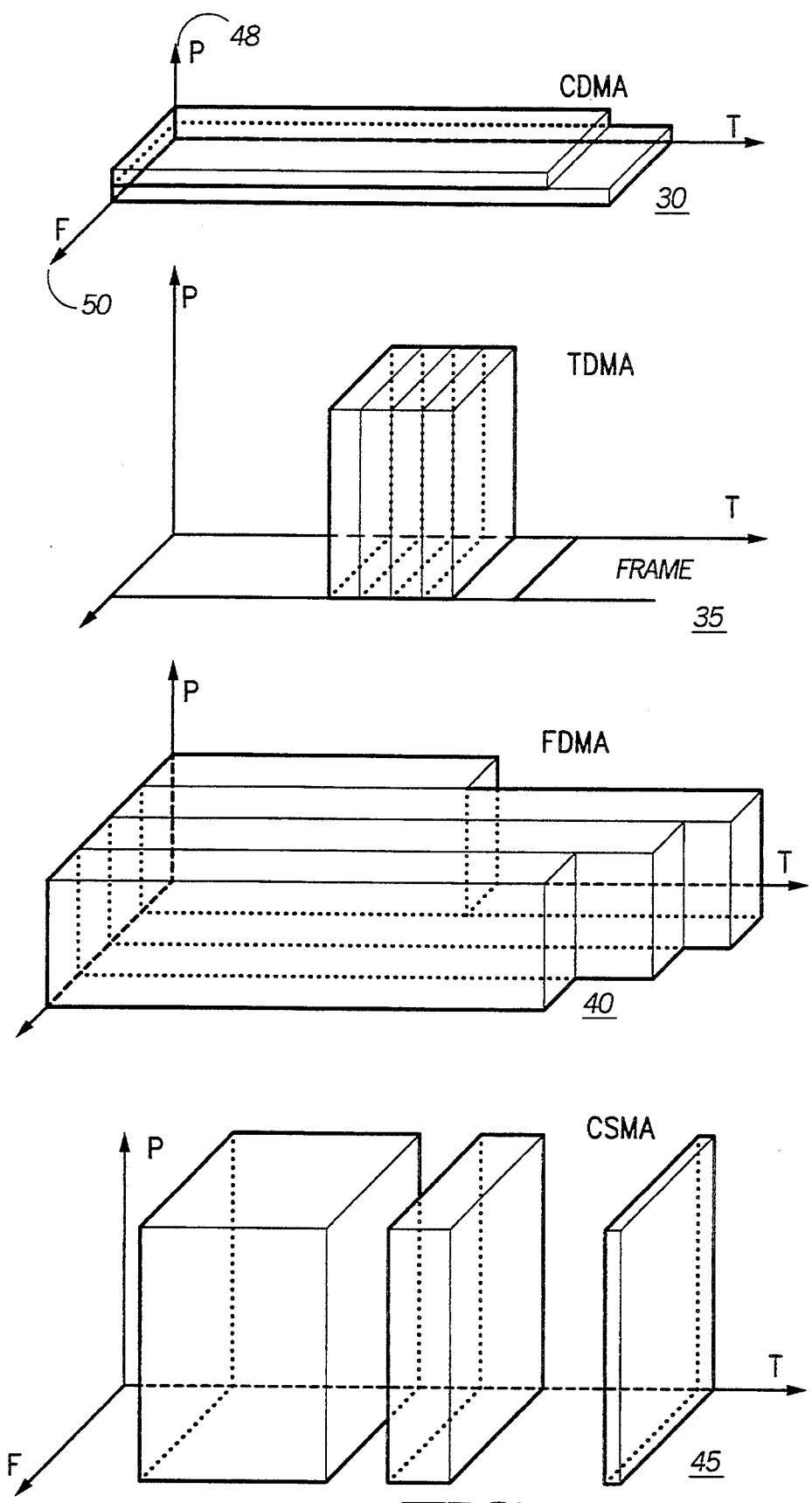
FIG. 3 is a graphical representation of frequency, power and time usage of various types of RF communication systems.

A transmission or operational etiquette can be difficult to define when many systems having a variety of properties attempt to operate on the same channel. Referring to FIG. 3, a variety of multiple access techniques are depicted as effecting the frequency, power, and time usage of a channel. The performance characteristics of the various multiple access techniques are depicted relative one to another. Code division multiple access (CDMA) 30 of a signal results in transmissions which are spread over a large amount of time 46 in several frequencies 50, but do not require much power 48. On the other hand, time division multiple access (TDMA) transmissions 35 have a multiple of flames, each frame requiring an equal amount of time 46 on an equal number of frequencies 50 at an equal power 48. It can be seen that the power required for a TDMA transmission 35 is typically more than the power required for CDMA transmissions 30.

In a like manner, frequency division multiple access (FDMA) transmissions 40 appear in frames on a number of frequencies, the use of each frequency having a different amount of time, but lower power output. While CDMA 30, TDMA 35 and FDMA 40 transmissions have predictable characteristics, carrier sense multiple access (CSMA) transmissions 45 have no predictable characteristic as to time. The power output and the frequency used is similar for each CSMA 45 transmission, but the amount of time that the transmission occurs can vary depending upon how much information is to be transmitted and how much traffic is on the channel. Basically, a CSMA transmission can take over the channel for transmission, pre-empting TDMA, FDMA, or CDMA transmissions.

In accordance with the present invention, an operation etiquette is defined which is diversified, thereby requiring no central control. The guidelines for defining the operation etiquette to be used within an unlicensed bandwidth are: fairness to the users, a minimization of frequency resources, and an incentive for all RF communication systems to strive for spectral efficiency. As to fairness, no one RF communication system should be able to monopolize the frequency bandwidth. In addition, the operation etiquette strives to allow a system utilizing a small amount of frequency spectrum to acquire a new spectrum easier than a system which is utilizing a large amount of the frequency spectrum. This regulation, however, does not permit the use of multiple minimum width channels to disallow wider band services. Also, an isochronous system is able to access at least one isochronous frequency channel if needed. As to minimization of resources, the operation etiquette of the present invention always attempts to minimize the occupied frequency spectrum, the emitted power by the various RF communication systems, and system overhead necessary for maintaining the operation etiquette. Finally, the operation etiquette of the present invention provides an incentive to the system for efficient channelization. Any system with poor spectral efficiency is not awarded more spectrum compared with other higher, more spectrally efficient systems when the spectrum is heavily used. The subdivided band resulting in eight isochronous frequency channels also advantageously allows an increased opportunity for obtaining a bandwidth.

Referring next to FIG. 4, a channelization of the 20 MHz unlicensed band which can be used for RF communications, such as personal communication systems, in accordance with the present invention is shown. The 20 MHz band is divided into a 10 MHz isochronous sub-band 60 and a 10 MHz asynchronous sub-band 65. The 10 MHz isochronous sub-band 60 is further divided into eight 1.25 MHz isochronous frequency channels 70. Under normal conditions, as depicted at line 75, the 20 MHz band allows isochronous communication 76, 78 on one or more of the isochronous frequency channels 70 and asynchronous communications 80 within the asynchronous sub-band 65. It can be seen at line 85 that the asynchronous data communications 80' can use the isochronous frequency channels 70 within the isochronous sub band 60 when not in use. This aspect of the present invention advantageously allows use of the CSMA multiplexing techniques.

To improve fairness, spectral efficiency and simplify implementation, the definition of the isochronous frequency channels 70 in the isochronous sub-band is crucial. A system is assigned to one of the isochronous frequency channels 70 and is, thus, the primary system, or user, of that isochronous frequency channel 70, and, likewise, the isochronous frequency channel 70 is the prime frequency band or channel for the primary users. The implementation of the primary channel includes the initial assignment and then a possible reassignment. In accordance with the preferred embodiment of the present invention, the initial assignment of primary channels is based on a 99%. power bandwidth and reassignment of the primary channel. A system that is not the primary user of a isochronous frequency channel 70 is identified as a secondary user of that isochronous frequency channel 70 and the primary users have a priority of use over the secondary users. A system is, therefore, able to use all the bandwidth in case there is no other heterogeneous system nearby and each of the active systems has an assured minimum bandwidth independent of the existence of other systems. This improves the spectral efficiency and the fairness of the systems.

In accordance with the preferred embodiment of the present invention, the priority of use of the isochronous frequency channels 70 considers the following: (1) a primary user has priority over a secondary user; (2) channel access scan sequence follows priority order of isochronous frequency channels; (3) secondary isochronous frequency channels closer in frequency to primary channels are higher priority (including tie-breaking criteria); (4) a system utilizing fewer isochronous frequency channels or less spectrum has priority over a system occupying a larger number of isochronous frequency channels or more spectrum; (5) a system emitting less power over a given bandwidth has priority over a system emitting higher power over the same bandwidth; and (6) a home system (a system operating in the sub-band to which it is assigned) has priority over a foreign system (systems other than home systems).

Referring to FIG. 5, a block diagram of a base station, such as transmitters 14, 20 (FIG. 2), in accordance with the present invention is shown. Communication with the base station is provided by an antenna 100 and a conventional communications transceiver 102. The communications transceiver 102 receives radio frequency (RF) signals and transmits RF signals. The communications transceiver 102 is coupled to a decoder 104 which decodes the received RF signals. A controller 106 receives the decoded signal from the decoder 104 and provides a signal to the communications transceiver 102 for transmission therefrom as RF signals.

The controller 106 controls the operation of the base station for all operations. In addition, the controller 106 is coupled to a network connection 108 for interconnecting the base stations of the RF communications system, such as via the public switched telephone network (PSTN). The controller 106 is coupled to a memory 110 for accessing and maintaining information on the system's operation. The memory 110 may store operational software in a read only memory (ROM) section and may temporarily store information received or generated during operation in a random access memory section (RAM).

In accordance with the present invention, an etiquette controller 112 is coupled to the controller for governing an operational etiquette by assigning a channel for the controller 106 to communicate in accordance with the present invention. The etiquette controller 112 is coupled to the communications transceiver 102 for monitoring the received RF signals to determine whether a channel is free or not and for providing a channel relinquishment signal thereto for transmission therefrom. The etiquette controller 112 is coupled to the decoder 104 to determine whether received RF signals are decodable as an interoperable transmitter signal. The etiquette controller 112 is coupled to the controller 106 for providing channel assignments thereto, and is coupled to the memory 110 for storing information therein and for retrieving information therefrom for operation in accordance with the present invention.

Though depicted for functional purposes as a discrete component, the etiquette controller 112 can be software loaded into the controller 106. The interconnections between the functional blocks of the base station and the etiquette controller 112 already exist in most base stations between the controller 106 and equivalent functional blocks. Thus, modification of base stations in current operation to operate in accordance with the present invention would require only minor modifications, such as loading software.

The present invention requires minimal impact on the design and cost of radio technology within the variety of radio communication systems. In addition, the modification cost is minimal while providing some incentive for the various RF communication systems to justify the additional costs. There is no central control for the various RF communication systems to connect, thereby maintaining independent and diversified operation of the heterogeneous RF communications systems.

Figure 6:
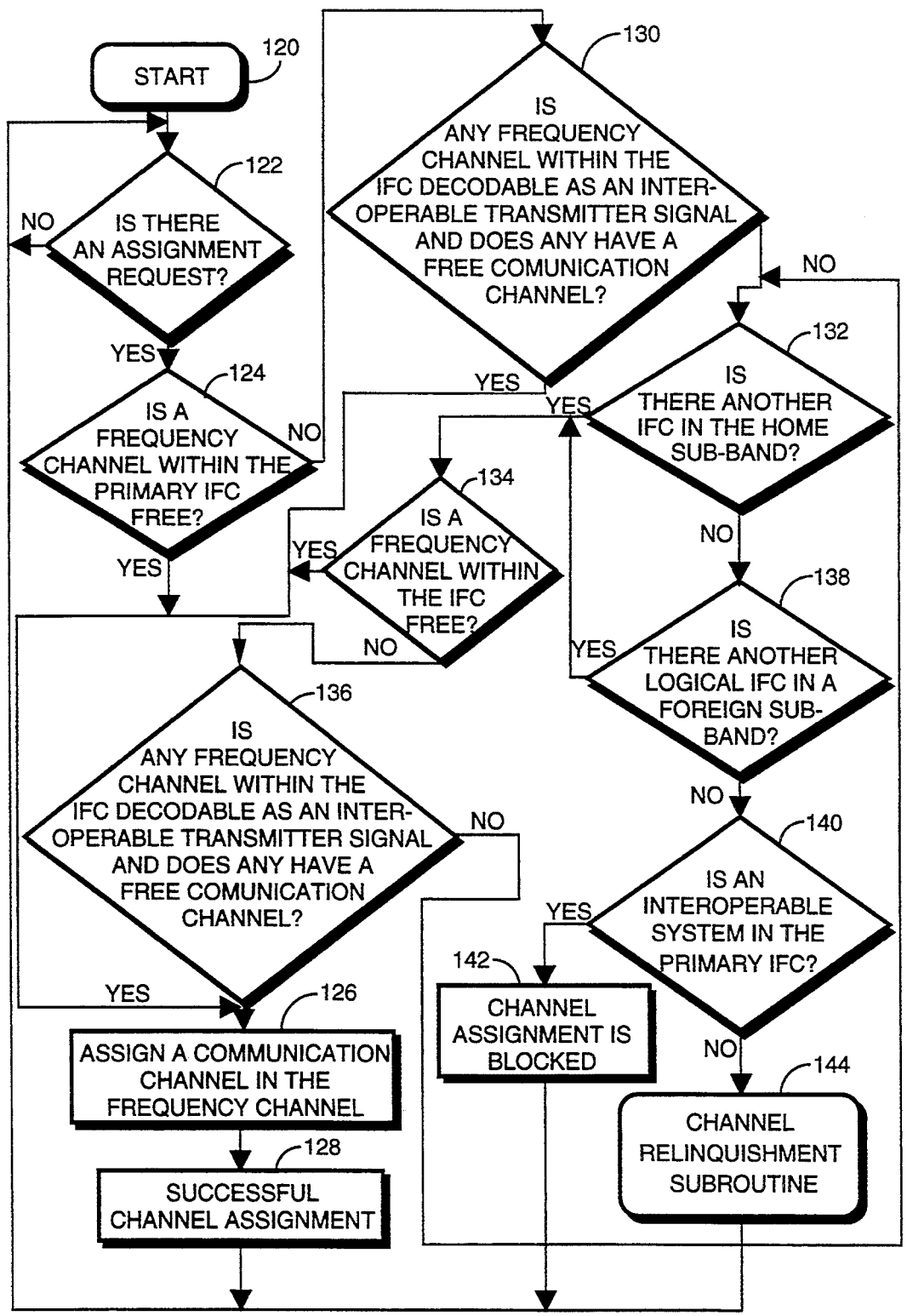
FIG. 6 is a flowchart of the operation of the etiquette controller of the base station of FIG. 5 in accordance with the preferred embodiment of the present invention.

Referring to FIG. 6, a flow chart depicting the operation of the etiquette controller 112 is shown. The etiquette controller 112 sets up a priority for channel usage. In accordance with the preferred embodiment of the present invention, the priority is a combination of several factors. First, priority is determined from whether the channel is a primary channel or secondary channel for the system requesting use. Next, the bandwidth occupation and power emission are factors to be considered in setting up a channel for use by a system. In addition, whether a channel is within a home sub-band or a foreign sub-band of the system seeking usage of the channel is a factor to be considered. The channel assignment and handoff thresholds are defined in accordance with the preferred embodiment of the present invention in such a way that the system with higher priority will have higher assignment and handoff threshold. The object of the operation of the etiquette controller 112 in accordance with the present invention is to allow a system with higher priority to have a better chance to acquire and keep a channel when competing with lower priority systems.

After starting operation 120, the etiquette controller 112 awaits an assignment request 122 from the controller 106. When an assignment request 122 is received, the etiquette controller 112 monitors the output of the communications transceiver 102 to determine whether a frequency channel within the primary isochronous frequency channel (IFC) assigned to the base station is free 124. To determine if a channel is free 124, the etiquette controller 112 monitors the channel for a measuring time, defined as a time interval that a system must listen before a connection request can be granted. The value of the measuring time is different for different systems and is defined such that systems with higher priority will have a shorter measuring time. If a frequency channel within the primary IFC is free 124, the etiquette controller 112 signals the controller 106 to assign a communication channel in the frequency channel 126. The channel assignment is, therefore, successful 128 and processing returns to await the next assignment request 122.

If there is not a free frequency channel within the primary IFC 124, the etiquette controller 112 monitors the output of the decoder 104 to determine whether any frequency channel within the IFC is decodable as an interoperable transmitter signal (e.g., an interoperable system is broadcasting within the IFC) and whether a free communication channel exists in a frequency channel 130. If both conditions are met (i.e., a frequency channel within the IFC is decodable as an interoperable transmitter signal and the frequency channel has a free communication channel) 130, the etiquette controller 112 signals the controller 106 to assign a communication channel 126 in the frequency channel, the channel assignment is successful 128, and processing returns to await the next assignment request 122.

If no frequency channel within the IFC is decodable as an interoperable transmitter signal or no frequency channel within the IFC has a free communication channel 130, the etiquette controller 112 determines whether there is another IFC in the home sub-band 132. The home sub-band is the sub-band associated with the RF communications system of the base station. If there is another IFC in the home sub-band 132 and a frequency channel within the other IFC is free 134, the etiquette controller 112 signals the controller 106 to assign a communication channel in the free frequency channel 126, 128, and processing returns to await the next channel assignment request 122.

If there is another IFC in the home sub-band 132 and there is no free frequency channel within the IFC 134, the etiquette controller 112 monitors the output of the decoder 104 to determine whether any frequency channel within the IFC is decodable as an interoperable transmitter signal (e.g., an interoperable system is broadcasting within the IFC) and whether the frequency channel comprises a free communication channel 136. If both conditions are met 136, the etiquette controller 112 signals the controller 106 to assign a communication channel within the frequency channel 126, 128 and processing returns to await the next channel assignment request 122. If one or the other of the conditions are not met (i.e., no frequency channel within the IFC is decodable as an interoperable transmitter signal or no frequency channel has a free communication channel) 136, processing determines whether there is another IFC in the home sub-band 132.

If there is not another IFC in the home sub-band 132, the etiquette controller 112 determines whether there is another logical IFC in a foreign sub-band 138 (i.e., a sub-band not associated with the RF communications system of the base station). If there is a logical IFC in a foreign sub-band 138 and a frequency channel within the logical IFC is free 134, the etiquette controller 112 signals the controller 106 to assign a communication channel in the frequency channel 126, 128, and processing returns to await the next channel assignment request 122.

If there is another logical IFC in a foreign sub-band 138 and there is not a free frequency channel within the IFC 134, the etiquette controller 112 monitors the output of the decoder 104 to determine whether a frequency channel within the logical IFC is decodable as an interoperable transmitter signal and whether the decodable frequency channel comprises a free communication channel 136. If both conditions are met (i.e., the IFC has a frequency channel which is decodable as an interoperable transmitter signal and has a free communication channel) 136, the etiquette controller 112 signals the controller 106 to assign a free communication channel in the frequency channel 126, 128 and processing returns to await the next channel assignment request 122. If one or both of the conditions are not met (i.e., no frequency channel within the IFC is decodable as an interoperable transmitter signal or the frequency channels do not have a free communication channel) 136, processing returns to determine whether there is another IFC in the home sub-band 132.

In accordance with an alternative embodiment of the present invention, the NO branch of decision block 132 could bypass decision block 138 and proceed to decision block 140. In this alternative embodiment, the existence of free frequency channels in sub-bands other than the home sub-band are not considered.

Returning to the description of the preferred embodiment of the present invention, if there are no IFCs in the home sub-band 132 which have not been examined and there are no IFCs in foreign sub-bands 138 which have not been examined, processing determines whether there is an interoperable system (i.e., an RF communication system having interoperable operational properties) in the primary IFC 140. Recognition of interoperable RF communication systems operating in a channel enables packing of interoperable systems for greater efficiency and allows implementation of the primary band concept using a fully distributed control system. Also, recognition of interoperable RF communication systems operating in a channel enables the implementation of a priority mechanism based on spectrum occupancy which leads to fair access and an efficient use of spectrum.

If there is an interoperable system in the primary IFC 140, the etiquette controller 112 signals the controller 106 that the channel assignment is blocked 142 and processing returns to await the next channel assignment request 122. If there is not an interoperable system in the primary IFC 140, the etiquette controller 112 performs a channel relinquishment subroutine 144 in accordance with the present invention, after which processing returns to await the next channel assignment request 122.

Figure 7:
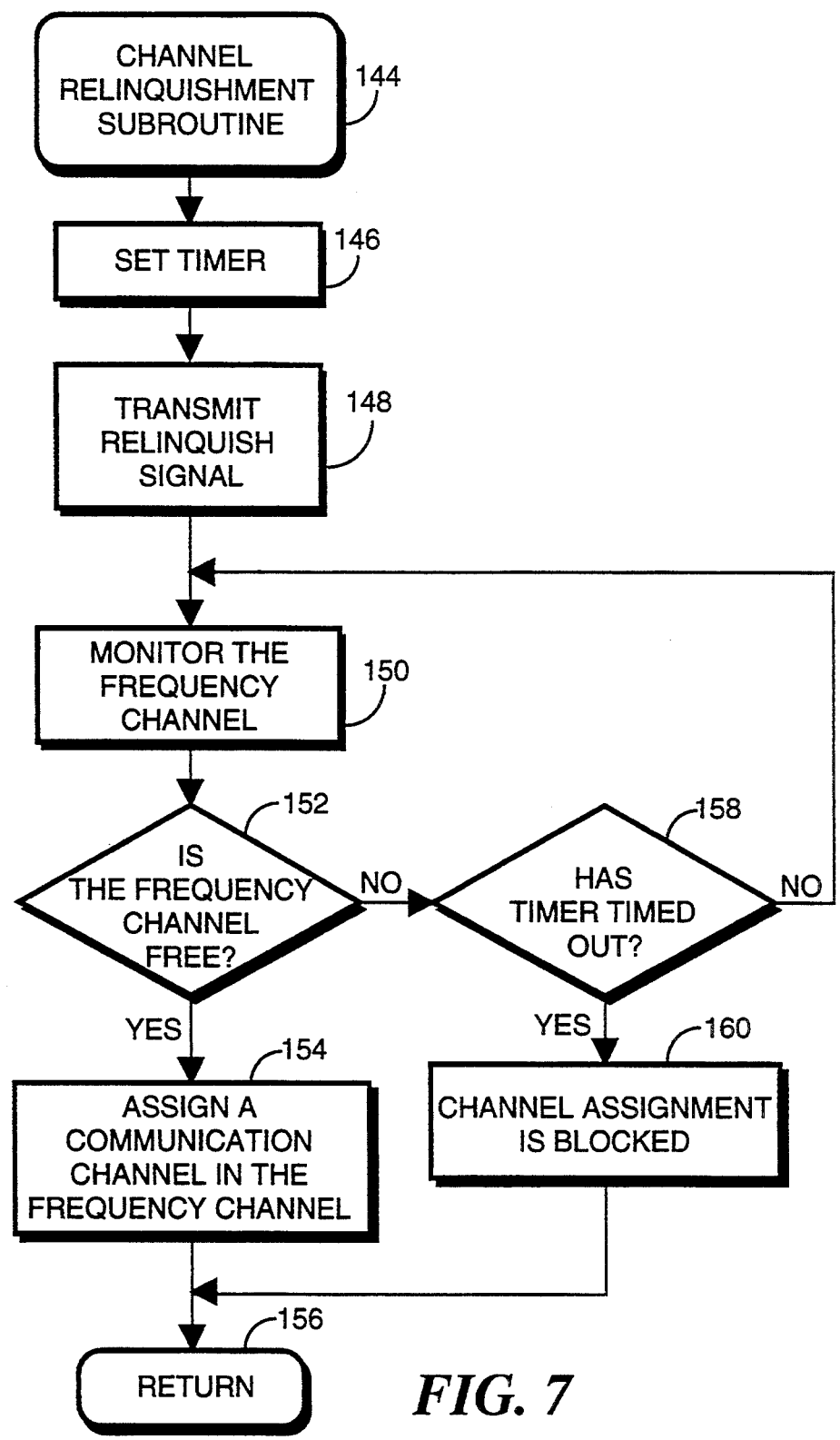
FIG. 7 is a flowchart of the channel relinquishment subroutine of the etiquette controller of the base station of FIG. 5 in accordance with the preferred embodiment of the present invention.

Referring next to FIG. 7, a flow chart of the operation of the channel relinquishment subroutine 144 in accordance with the preferred embodiment of the present invention is depicted. A timer within the etiquette controller 112 is set 146 for a predetermined monitoring time and a channel relinquishment signal is provided to the communications transceiver 102 for transmission therefrom 148. The predetermined monitoring time is defined to be longer than a relinquishment time as defined below.

The etiquette controller 112 is programmed to relinquish a channel in response to unacceptable channel quality or detection of a channel relinquishment signal. Detection of poor channel quality by the etiquette controller 112 triggers a relinquishment timer within the etiquette controller 112. The relinquishment timer is loaded with a relinquishment time based on priority and defined as a time interval in which a call must be relinquished by systems in the isochronous frequency channel after the channel quality of the connection becomes unacceptable or after detection of the channel relinquishment signal, i.e., a persistent unique signal defined for all of the RF communication systems operating in the unlicensed bandwidth. The bandwidth of the channel relinquishment signal in accordance with the present invention is less than 1.25 MHz. The value of the relinquishment time is defined so that systems with higher priority will have a longer handoff time.

In implementation of the present invention, it is preferable that all RF communication systems operating within the unlicensed band are able to detect during normal operation the existence of other active RF communication systems in the band when the signal to interference and noise ratio drops below a predetermined decibel limit (e.g., 6 dB) and/or detect the channel relinquishment signal when the received unique signal power is at least as predetermined decibel level (e.g., 24 dB) above thermal noise. Alternatively, the RF communication systems could stop transmission in the isochronous frequency channel intermittently (e.g., every 10 seconds) with a predetermined measuring gap (e.g., 0.05 seconds) to measure if the channel is free. The channel will then be relinquished whenever the channel is no longer free. The etiquette controller 112 monitors the received RF signals on the frequency channel 150 to determine whether the frequency channel is free 152. If the channel is free 152, a communication channel in the frequency channel is assigned 154 and processing returns 156 to await the next channel assignment request 122 (FIG. 6).

After transmitting the channel relinquishment signal 148, if the frequency channel is not free 152, the frequency channel is monitored 150 until the frequency channel is free 152 or the timer has timed out 158. When the channel is free 152, a communication channel in the frequency channel is assigned 154. When the timer times out 158, the channel assignment is blocked 160 and processing returns 156 to await the next channel assignment request 122 (FIG. 6).

Figure 8:
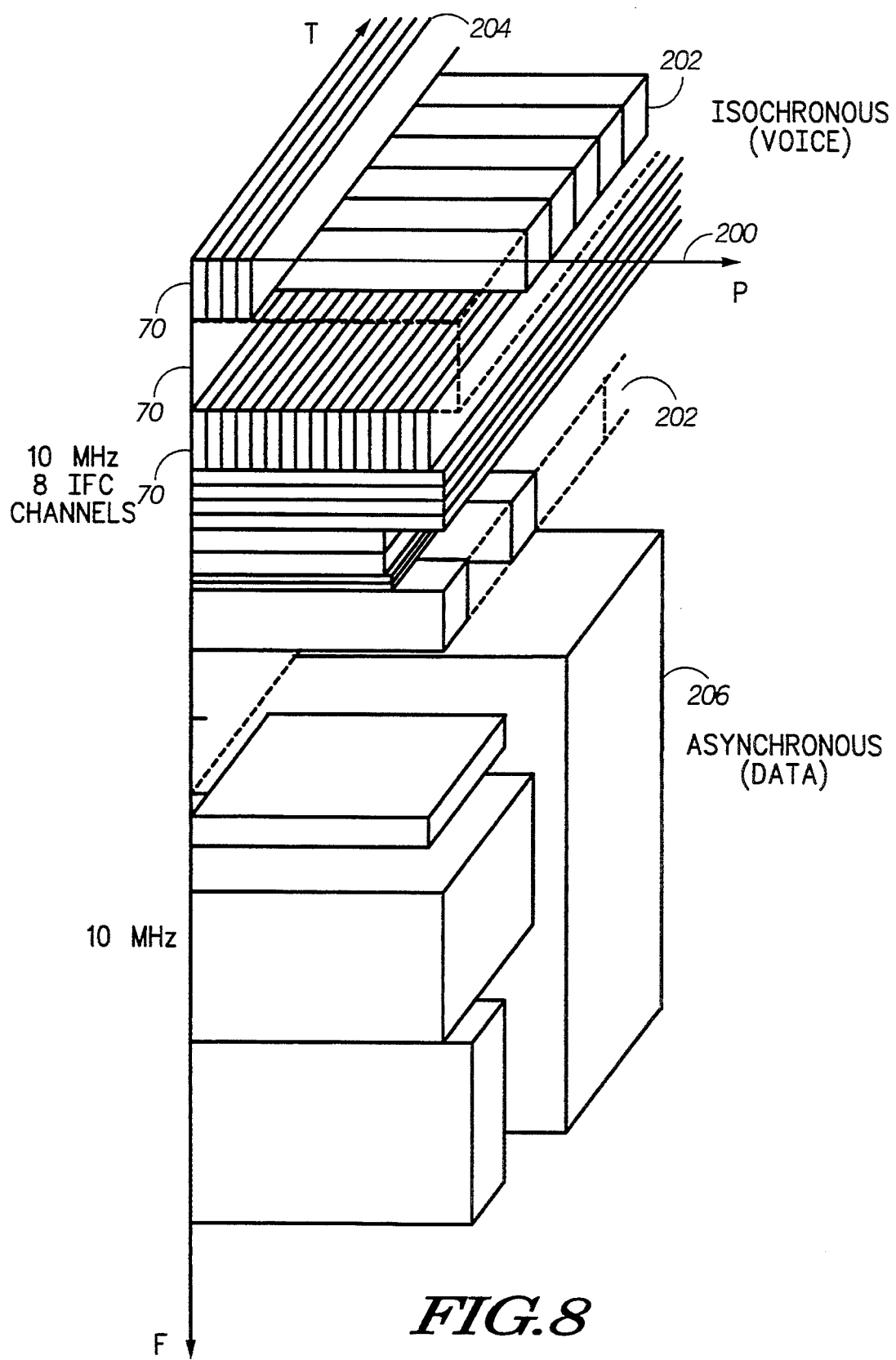
FIG. 8 is a diagram of the frequency, power and time usage of various types of RF communication systems within the 20 MHz portion of a shared unlicensed frequency bandwidth in accordance with the present invention.

To allow concurrent operation of a variety of heterogeneous RF communication systems having different multiple access techniques, the operation etiquette in accordance with the present invention compacts the transmissions in a manner which allows efficient operation of the various communication systems. Referring to FIG. 8, a representation of the operation of the present invention within a 20 MHz unlicensed bandwidth of the 2 GHz Instrumentation, Scientific and Measurement (ISM) FCC allocated band is shown. Half of the 20 MHz band is divided into the eight isochronous frequency channels 70. Each of the eight isochronous frequency channels 70 is dedicated primarily to one type of isochronous communications, such as voice communications. Thus, FDMA communications 200, TDMA communications 202, and CDMA communications 204 can take place on these eight isochronous frequency channels. Asynchronous data communications, such as CSMA communications 206, take place within the other half of the 20 MHz band reserved for such communications. The improved spectral efficiency is evidenced by the packing of the similar communications systems into the portions of the bandwidth corresponding to the assignment of primary users of their home sub-bands.

To improve spectral efficiency, the number of occupied isochronous frequency channels is minimized when the RF communication systems are defined to have bandwidths that are either integral multiples of the 1.25 MHz bandwidth of the isochronous frequency channels or an even portion (e.g. 1.25 MHz/M, where M is any positive integer) of the bandwidth of the isochronous frequency channels. Additionally, to improve the spectral efficiency, a bandwidth scanning sequence could alternatively be defined such that the homogeneous systems will pack together while operating without central control, thereby conserving bandwidth.

Implementation of the present invention merely requires that all RF communication systems listen on a bandwidth before talking, since it is crucial that each system be able to measure the peak power of the bandwidth before using it. The present invention, advantageously utilizes channel quality measurements present in most RF communication systems today and easily adaptable when not present in an RF communication system.

By now it should be appreciated that there has been provided a method and apparatus to allow devices of different RF communication systems to coexist in an interference-limited environment by constraining all devices to a known behavioral envelope resulting in greater spectral efficiency and increased frequency reuse throughout the heterogeneous RF communication systems.

What is claimed is:

1. A method for establishing communication etiquette amongst a plurality of radio frequency (RF) communication systems sharing a frequency bandwidth, the frequency bandwidth comprising a plurality of sub-bands including an isochronous frequency sub-band comprising a plurality of isochronous frequency channels, each isochronous frequency channel occupying a predetermined bandwidth and suitable for supporting communication between multiple RF communication systems on multiple communication channels, the method comprising the steps of:

assigning one of said isochronous frequency channels as a primary isochronous frequency channel for an RF communication system seeking to activate in the frequency bandwidth;

determining whether there is a free communication channel for the seeking RF communication system for assignment in any of the sub-bands;

if there is not a free communication channel for assignment in any isochronous frequency channel in the entire isochronous frequency sub-band, determining whether an RF communication system transmitting in a communication protocol which is interoperable with the seeking RF system is active in the primary isochronous frequency channel in said isochronous frequency sub-band; and denying communication channel assignment to the seeking RF communication system if an RF communication system which is using a communication protocol that is interoperable with the seeking RF communication system is active in the primary isochronous frequency channel.

2. The method according to claim 1 further comprising the steps of:

transmitting a channel relinquishment signal in said primary isochronous frequency channel if it is determined that an RF communication system is active in said primary isochronous frequency channel which is using a communication protocol that is not interoperable with the seeking RF communication system to remove an RF communication using a non-interoperative communication protocol from the primary isochronous frequency channel;

monitoring a communication channel within the primary isochronous frequency channel for a predetermined monitoring time after the channel relinquishment signal is transmitted; and determining whether a communication channel within the primary isochronous frequency channel is free for assignment in response to the issuance of the channel relinquishment signal.

3. The method according to claim 2 further comprising the step of assigning for communication by the seeking RF communication system a communication channel in the primary isochronous frequency channel if it is determined that a communication channel within the primary isochronous frequency channel is free for assignment.

4. The method according to claim 3 further comprising the step of denying assignment of a communication channel in the frequency bandwidth to the seeking RF communication system if it is determined that the communication channel is not free for the call assignment after expiration of the predetermined monitoring time.

5. An apparatus in a first radio frequency (RF) communications system for radio frequency communications in a frequency bandwidth shared with at least a second RF communication system, the frequency bandwidth comprising a plurality of sub-bands including an isochronous sub-band dedicated to isochronous communication systems the isochronous sub-band comprising a plurality of isochronous frequency channels each suitable for supporting communication between multiple RF communication systems on multiple communication channels, the apparatus comprising:

an RF transceiver for receiving first RF signals and for transmitting second RF signals;

a decoder coupled to the RF transceiver for determining whether the first RF signals are decodable as an interoperable transmitter signal transmitted by an RF communication system other than said first RF communication system and with which said first RF communication system is capable of interoperating;

a controller coupled to the decoder and the RF transceiver for controlling communication on an assigned communication channel; and an etiquette controller coupled to the RF transceiver, decoder and controller for monitoring the first RF signals in a first isochronous frequency channel for determining whether the first isochronous frequency channel is free from use by other RF communication systems; if the first isochronous frequency channel is determined to be free, assigning for use by the first RF communication system a communication channel in the first isochronous frequency channel; if the first isochronous frequency channel is determined not to be free, determining whether the first RF communication system is interoperative with communication protocol signals transmitted by other RF communication systems in the first isochronous frequency channel and whether a communication channel is available in the first isochronous frequency channel; and if it is determined that the first RF communication system is interoperative with communication protocol signals transmitted in the first isochronous frequency channel, assigning for use by the first RF communication system the communication channel determined to be available in the first isochronous frequency channel.

6. The apparatus of claim 5 wherein the etiquette controller assigns a free communication channel in an isochronous frequency channel different from the first isochronous frequency channel within the isochronous sub-band as the assigned communication channel to the first RF communication system if none of the communication channels within the first isochronous frequency channel are free and none of the isochronous frequency channels are occupied by other RF communication systems using communication signal protocols which are interoperable with the first RF communication system and have a free communication channel.

7. The apparatus of claim 6 wherein the etiquette controller assigns a free communication channel in a logical isochronous frequency channel in another of the plurality of sub-bands as the assigned communication channel to the first communication system if assignment of a free communication channel in the isochronous frequency channel different from the first isochronous frequency channel as the assigned communication channel to the first RF communication system cannot be made.

8. The apparatus of claim 7 wherein if the etiquette controller cannot make channel assignment to the logical isochronous frequency channel, the etiquette controller denies communication channel assignment to the first. RF communication system by the controller after the etiquette controller determines that an RF communication system which is using a communication protocol that is interoperable with the first RF communication system is active in the first isochronous frequency channel.

9. The apparatus of claim 8 wherein the etiquette controller provides a channel relinquishment signal to the RF transceiver for transmission therefrom in the first isochronous frequency channel to remove an RF communication using a communication protocol which is not interoperable with the first RF communication system from the first isochronous frequency channel, and wherein the etiquette controller monitors the first RF signals for a predetermined monitoring time to determine whether the first isochronous frequency channel is made free for assignment in response to the issuance of the channel relinquishment signal.

10. The apparatus of claim 9 wherein the etiquette controller assigns a free communication channel in the first isochronous frequency channel as the assigned communication channel if the etiquette controller determines that a communication channel is made free for assignment in response to the issuance of the channel relinquishment signal in the first iscochronous frequency channel.

11. The apparatus of claim 10 wherein the etiquette controller denies assignment of a communication channel in the frequency bandwidth if the etiquette controller determines that a communication channel in the first isochronous frequency channel is not free for assignment before the expiration of the predetermined monitoring time.

12. A method for establishing communication etiquette amongst a plurality of heterogeneous radio frequency (RF) communication systems sharing a frequency bandwidth, the frequency bandwidth comprising a plurality of sub-bands including at least one sub-band dedicated to isochronous communication systems which comprises a plurality of isochronous frequency channels, each isochronous frequency channel occupying a predetermined bandwidth and suitable for supporting communication between multiple RF communication systems on multiple communication channels, the method comprising steps of:
- determining whether an RF communication system seeking to activate in the frequency bandwidth is isochronous or asynchronous;
- if the seeking RF communication system is isochronous, determining whether a first isochronous frequency channel is free from use by other RF communication systems;
- if the first isochronous frequency channel is determined to be free, assigning for use by the seeking RF communication system a communication channel in the first isochronous frequency channel;
- if the first isochronous frequency channel is determined not to be free, determining whether the seeking RF communication system is interoperative with communication protocol signals used by other RF communication systems active in the first isochronous frequency channel and whether a communication channel is available in the first isochronous frequency channel; and
- if it is determined that the seeking RF communication system is interoperative with communication protocol signals transmitted in the first isochronous frequency channel, activating the seeking RF communication system in the communication channel determined to be available in the first isochronous frequency channel.

13. The method of claim 12, and further comprising the step of assigning to each isochronous RF communication system which is to activate in the frequency bandwidth a primary isochronous frequency channel which is attempted prior to other isochronous frequency channels, and wherein the first isochronous frequency channel is the primary isochronous frequency channel.

14. The method of claim 13, and further comprising the step of assigning to each isochronous RF communication system which is to activate in the frequency bandwidth a secondary isochronous frequency channel which is monitored after it is determined that no communication channels in the primary isochronous frequency channel are free.

15. The method of claim 14, and further comprising the step of activating the seeking RF communication system in a communication channel determined to be free in the secondary isochronous frequency channel if it is determined that the seeking RF communication system is interoperable with a communication protocol used by an RF system active in the secondary frequency channel.

16. The method of claim 12, and further comprising steps of:
- if there is not a free communication channel for assignment in any isochronous frequency channel in the entire isochronous frequency sub-band or in an isochronous frequency channel of a foreign sub-band, determining whether an RF communication system transmitting in a communication protocol which is interoperable with the seeking RF system is active in the first isochronous frequency channel in said isochronous frequency sub-band; and
- denying assignment of a communication channel to the seeking RF communication system if an RF communication system which is using a communication protocol that is interoperable with the seeking RF communication system is active in said first isochronous frequency channel.

17. The method according to claim 16, and further comprising the steps of:
- transmitting a channel relinquishment signal in said first isochronous frequency channel if it is determined that an RF communication system is active in said first isochronous frequency channel which is using a communication protocol that is not interoperable with the seeking RF communication system to remove the RF communication system using a non-interoperative communication protocol from the first isochronous frequency channel;
- monitoring a communication channel within the first isochronous frequency channel for a predetermined monitoring time after the channel relinquishment signal is transmitted; and
- determining whether a communication channel within the first isochronous frequency channel is free for assignment in response to the issuance of the channel relinquishment signal.

18. The method according to claim 17, and further comprising the step of assigning for communication by the seeking RF communication system a communication channel in the first isochronous frequency channel if the determining step determines a communication channel within the first isochronous frequency channel is free for assignment.

19. The method according to claim 18, and further comprising the step of denying assignment of a communication channel in the frequency bandwidth to the seeking RF communication system if the determining step determines that a communication channel is not free for the call assignment in the first isochronous frequency channel after the expiration of the predetermined monitoring time.

20. In an RF communication system for operation on a frequency bandwidth shared by multiple heterogeneous RF communication systems, the frequency bandwidth comprising a plurality of sub-bands including an isochronous sub-band dedicated to isochronous communication systems, the isochronous sub-band comprising a plurality of isochronous frequency channels each suitable for supporting communication between multiple RF communication systems on multiple communication channels, each RF communications system comprising:

an RF transceiver for receiving RF signals and for transmitting RF signals;

a decoder coupled to the RF transceiver for determining whether received RF signals are decodable as an interoperable transmitter signal transmitted by another RF communication system other than said RF communication system;

a controller coupled to the decoder and the RF transceiver for controlling communication on an assigned communication channel; and an etiquette controller coupled to the RF transceiver, the decoder and the controller for establishing the etiquette of said each RF communication system over the frequency bandwidth, said etiquette controller:

monitoring the RF signals in a first isochronous frequency channel for determining whether a first isochronous frequency channel is free from use by other RF communication systems; if the first isochronous frequency channel is determined to be free, assigning for use by said each RF communication system a communication channel in the first isochronous frequency channel; if the first isochronous frequency channel is determined not to be free, determining whether said each RF communication system is interoperative with communication protocol signals transmitted by other RF communication systems in the first isochronous frequency channel and whether a communication channel is available in the first isochronous frequency channel; and if it is determined that said each RF communication system is interoperative with communication protocol signals transmitted in the first isochronous frequency channel, activating said each RF communication system in the communication channel determined to be available in the first isochronous frequency channel.

21. The method according to claim 12 further comprising the step of:

if none of the isochronous frequency channels are free and the seeking RF communication system is determined not to be interoperative with communication protocols of RF communication systems active in any of the isochronous frequency channels, or none of the frequency channels have a free communication channel, and all of the isochronous frequency channels in the isochronous frequency sub-band are busy, assigning for communication of the seeking RF communication system a free communication channel in a logical third isochronous frequency channel in another of the plurality of sub-bands.

* * * * *

UNITED STATES PATENT AND TRADEMARK OFFICE
CERTIFICATE OF CORRECTION

PATENT NO. : 5,428,819
DATED : June 27, 1995
INVENTOR(S) : Wang et al.

It is certified that error appears in the above-indentified patent and that said Letters Patent is hereby corrected as shown below:

Column 13, line 14, delete "before" and insert --after--.

Signed and Sealed this

Nineteenth Day of December, 1995

Attest:

BRUCE LEHMAN

Attesting Officer

Commissioner of Patents and Trademarks